(12) United States Patent
Wish

(10) Patent No.: US 11,823,586 B1
(45) Date of Patent: Nov. 21, 2023

(54) APPARATUS FOR PLAYING CHORDS ON MUSICAL INSTRUMENTS FOR VISUALLY-IMPAIRED PEOPLE AND METHOD OF PERFORMING SAME

(71) Applicant: David Wish, Montclair, NJ (US)

(72) Inventor: David Wish, Montclair, NJ (US)

( * ) Notice: Subject to any disclaimer, the term of this patent is extended or adjusted under 35 U.S.C. 154(b) by 0 days.

(21) Appl. No.: 17/737,595

(22) Filed: May 5, 2022

(51) Int. Cl.
*G09B 15/00* (2006.01)
*G09B 21/00* (2006.01)
*G10G 1/02* (2006.01)

(52) U.S. Cl.
CPC ......... *G09B 15/004* (2013.01); *G09B 21/003* (2013.01); *G10G 1/02* (2013.01)

(58) Field of Classification Search
CPC ....... G09B 15/004; G09B 21/003; G10G 1/02
See application file for complete search history.

(56) References Cited

U.S. PATENT DOCUMENTS

| | | | | |
|---|---|---|---|---|
| 741,017 | A * | 10/1903 | Curtiss ................. | G09B 15/001 84/480 |
| 2,473,222 | A * | 6/1949 | Ruben ..................... | G10G 1/02 984/252 |
| 2,938,421 | A * | 5/1960 | Leonard ................... | G10G 1/00 84/474 |
| 2,944,349 | A * | 7/1960 | Kaufman ................ | G06K 21/02 D17/1 |
| 3,155,000 | A * | 11/1964 | Gnatt ........................ | G10G 1/02 84/478 |
| D205,401 | S * | 8/1966 | Schmoyer ....................... | D19/59 |
| 3,822,630 | A * | 7/1974 | Leonard ............... | G09B 15/004 84/471 R |
| 3,919,914 | A * | 11/1975 | Leonard ............... | G09B 15/004 84/474 |
| 3,921,493 | A * | 11/1975 | Leonard ............... | G09B 15/004 84/474 |
| D242,877 | S * | 12/1976 | Bologna .......................... | D17/9 |
| 4,041,828 | A * | 8/1977 | Leonard ............... | G09B 15/006 84/478 |
| 4,320,690 | A * | 3/1982 | Leonard ............... | G09B 15/004 84/480 |
| 4,781,099 | A * | 11/1988 | Koike ................... | G09B 15/002 84/478 |
| 6,881,883 | B2 * | 4/2005 | Harrison ................ | G09B 15/00 84/478 |
| 7,619,154 | B2 * | 11/2009 | Hammond ............. | G09B 15/08 84/478 |
| 7,875,785 | B2 * | 1/2011 | Hammond ............. | G09B 15/08 84/478 |
| D760,837 | S * | 7/2016 | Schnell ............................ | D17/9 |
| 10,121,387 | B1 * | 11/2018 | Craig ................... | G09B 15/026 |
| D841,090 | S * | 2/2019 | Cloyd ............................ | D19/62 |

(Continued)

*Primary Examiner* — Robert W Horn
(74) *Attorney, Agent, or Firm* — Manatt, Phelps & Phillips, LLP

(57) ABSTRACT

An apparatus for playing chords, scales and/or intervals on a musical instrument for visually-impaired people is provided. The apparatus can have a substantially rectangular card with multiple indicators attached to the card that a visually-impaired person can play all chords, intervals and scales on a piano with a dedicated card having the chord or scale configuration by aligning the indicators to any piano key and finding the other keys of the same chord or scale on the piano by aligning the other indicators.

21 Claims, 12 Drawing Sheets

(56) References Cited

U.S. PATENT DOCUMENTS

| | | | |
|---|---|---|---|
| 10,930,170 B1 * | 2/2021 | Craig | G09B 15/004 |
| 11,482,129 B2 * | 10/2022 | Holczer-Waroquet | G09B 15/08 |
| D972,630 S * | 12/2022 | Bourke | D17/9 |
| 2018/0330705 A1 * | 11/2018 | Palmowski | G06F 3/0412 |
| 2020/0105157 A1 * | 4/2020 | Brock | G09B 15/026 |

* cited by examiner

APPARATUS FOR PLAYING CHORDS ON MUSICAL INSTRUMENTS FOR VISUALLY-IMPAIRED PEOPLE AND METHOD OF PERFORMING SAME

CROSS-REFERENCE TO RELATED APPLICATIONS

This application is related to U.S. patent application Ser. No. 17/541,696, filed Dec. 3, 2021, which is hereby incorporated herein by reference in its entirety.

FIELD

This disclosure relates generally to apparatus for playing chords, scales and/or intervals on musical instruments and more specifically relates to apparatus and methods for playing chords, scales and/or intervals on piano keyboards for visually-impaired people.

BACKGROUND

In music, a note is a symbol denoting a musical sound. A note can also be the sound itself in English usage, for example, pitch classes are typically represented by the first seven letters of the Latin alphabet (A, B, C, D, E, F and G). The eighth note, or octave, is given the same name as the first, but has double its frequency.

In music, an interval is the relative distance between two notes that can be measured in tones or steps. The two notes can be played one note after another (or horizontally) to form melody. Alternatively, the two notes can be played at the same time (or vertically) to form harmonic sounds.

A musical scale is normally referred to an ordered sequence of notes. A scale ordered by increasing pitch is an ascending scale. Similarly, a scale ordered by decreasing pitch is a descending scale. A heptatonic scale is a musical scale that includes seven notes per octave. For example, a C major ascending heptatonic scale can include seven notes C, D, E, F, G, A and B per octave. On this scale, it starts with the C note followed by a sequence of intervals until the return to the C note again. A pentatonic scale is a musical scale with five notes per octave. For example, a C major pentatonic scale may include five notes C, D, E, G and A.

A chord is typically referred to any harmonic set of pitches or frequencies consisting of multiple notes that are heard as if sounding simultaneously. In music with a tonic key or home key, such as the tonal western classical music, the most frequently encountered chords are triads. A triad chord is formed with three distinct notes: a root note, a third note (the note or pitch two scale degrees above the root note), and a fifth note (the note or pitch four scale degrees above the root note). A chord can have more than three notes to form added tone chord, extended chord and tone cluster, etc. A chord progression is a series of chords that melody and rhythm are built.

A major chord is a chord that has a root, a major third and a perfect fifth. When a chord has these three notes alone, it is called a major triad. For example, a C major triad (a major triad built on C) contains the notes C-E-G. A minor chord is a chord that has a root, a minor third and a perfect fifth. When a chord has these three notes alone, it is called a minor triad. For example, a C minor triad (a minor triad built on C) contains the notes C-E♭-G.

Most modern pianos have a row of 88 black and white keys, 52 white keys for the notes of the C major scale (C, D, E, F, G, A and B) and 36 shorter black keys, which are raised above the white keys, and set further back on the keyboard. This means that the piano can play 88 different notes, spanning a range of a bit over seven octaves. Each octave of a piano keyboard comprises a row of 12 keys (7 white keys and 5 shorter black keys). Each of the white keys has a wider front portion and narrower back portion that each of the narrower back portion of the white key is around the same width as its neighboring black key or keys.

Typically, a piano fallboard is used to cover piano keys when a piano is not played. When the fallboard is opened, it can be placed in a substantially vertical position relative to the top surface of the keys. The narrower back portion of the white keys normally extend under the fallboard when the fallboard is opened while the black key stop before the fallboard, thus on the back end of each black key, there is a small gap between the black key and the inner side of the fallboard when the fallboard is opened.

In order to help people learn the variety of chords, scales and/or intervals the inventor here has created a set of sheet or card tools useful for pianos under the Jam Card brand (see https://www.littlekidsrock.org/hangcontent/JamCards-12122013.pdf.) A standard Jam Card is a substantially rectangular card having music notes printed or drawn in parallel along one side of the card. Typically, more than 12 notes of around the same width are printed or drawn to cover at least one octave. Each of the notes has a width corresponding to the narrower portion of a white key or the width of a black key of a piano or keyboard. The total width of 12 consecutive notes on the Jam Card is around the same as the width of one octave on a standard piano or keyboard. For a Jam Card associated with a specific chord, for example, a major chord, a root note (or a left most note) on the Jam Card is printed or drawn in red color while the $5^{th}$ note (which is associated with the major third) and the $8^{th}$ note (which is associated with the perfect fifth) on the Jam Card are printed or drawn in blue color. By inserting a Jam Card between the gap of the back end of black keys and the inner side of the piano fallboard and lining up the root (red note) on the Jam Card with any key of a piano for a desired chord, a piano learner can see that the other keys on a piano or keyboard associated with the specific chord are aligned with the blue color notes on the Jam Card.

However, the inventor here has found that it is not always easy, especially for visually-impaired people, to find chords, scales and/or intervals on a piano keyboard and see how the chords, scales and/or intervals are made even with the help of the standard Jam Cards with color-coded notes.

The inventor here has also found that an existing tool for the visually impaired has not been adapted for playing chords. (See https://www.indiegogo.com/projects/john-furniss-piano-service-adaptive-tools-for-the-blind#/.)

Accordingly, it is here recognized that a continued need exists to overcome and improve upon shortcomings in existing apparatus. In order to address the above-described exemplary problems, and other similar problems, what is needed is an apparatus for playing chords, scales and/or intervals on piano or keyboard, preferably adaptive, for visually-impaired people, thereby providing enhanced learning and playing experiences to the user.

SUMMARY

The present disclosure provides apparatus for playing chords, scales and/or intervals on piano or keyboard for visually-impaired people. The apparatus preferably includes a substantially rectangular sheet or card fitted with multiple indicators or protrusions that enable a visually-impaired person to play chords and scales on a piano corresponding to the card specific chord or scale configuration by aligning the indicators attached to the card to any piano key and finding the corresponding keys of the corresponding chord or scale on the piano.

DESCRIPTION OF EXEMPLARY EMBODIMENTS

Figure 1:
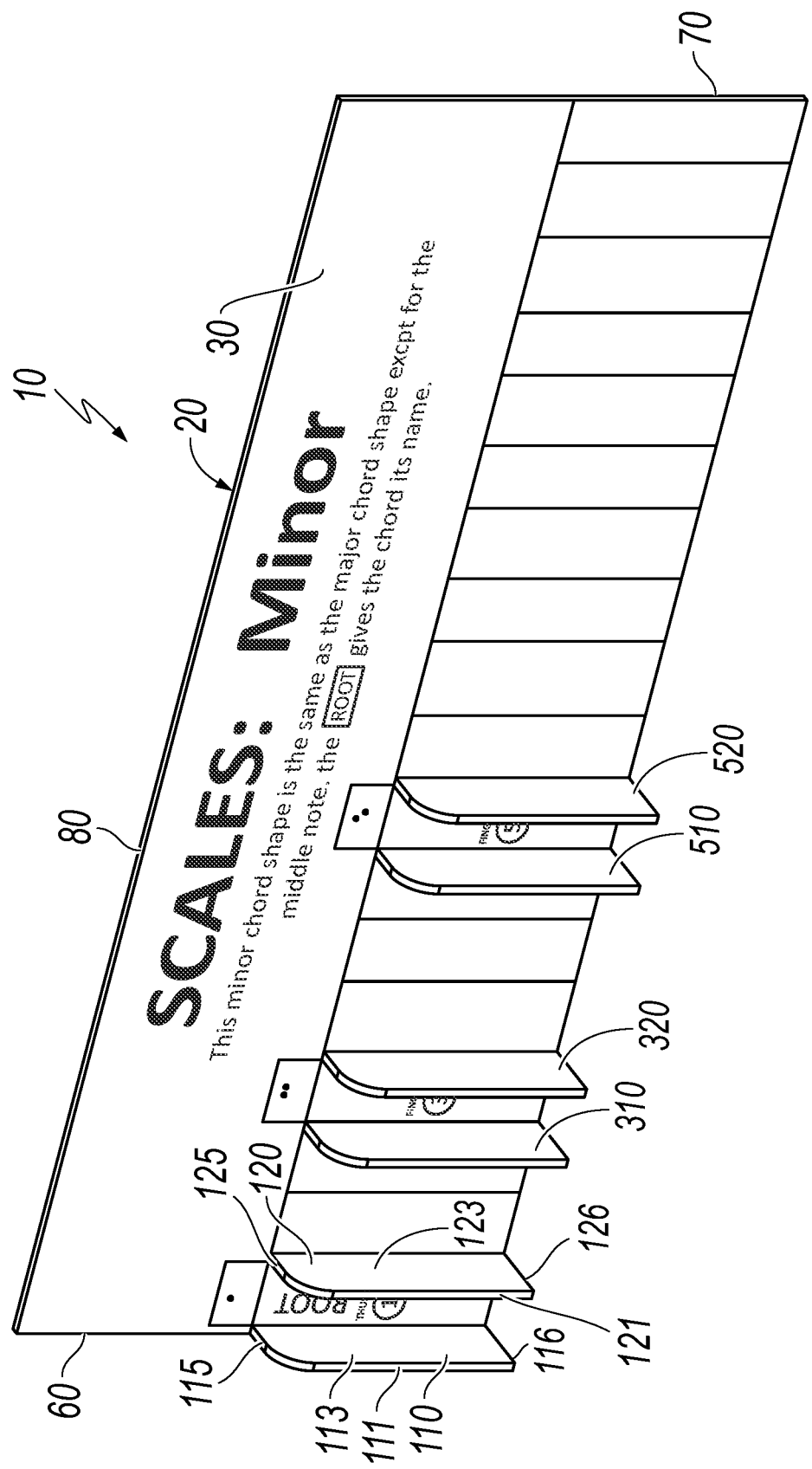
FIG. 1 illustrates a top-front-right perspective view of an exemplary minor chord card for the visually impaired.
Figure 2:
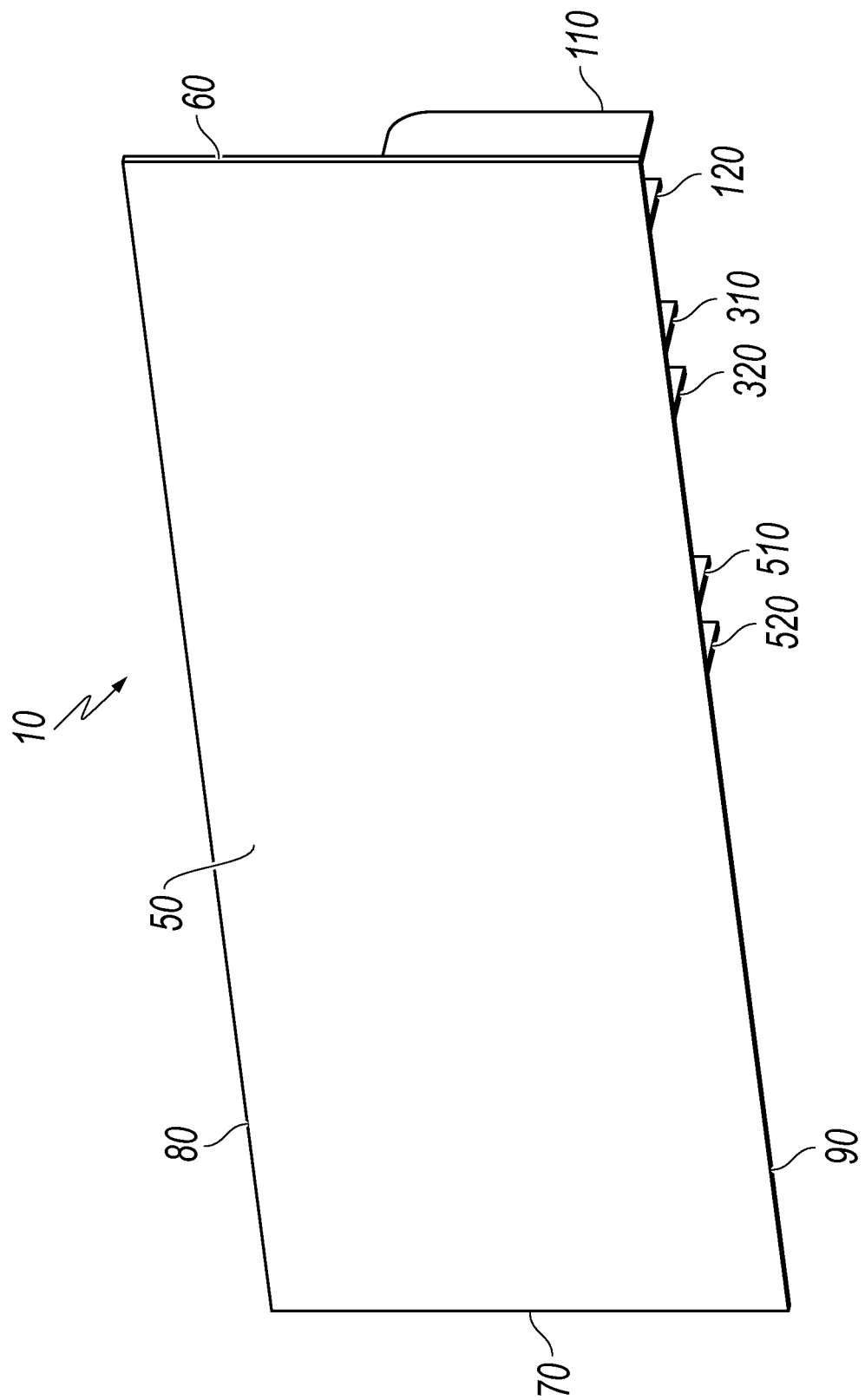
FIG. 2 illustrates a bottom-rear-left perspective view of the exemplary minor chord card of FIG. 1.
Figure 3:
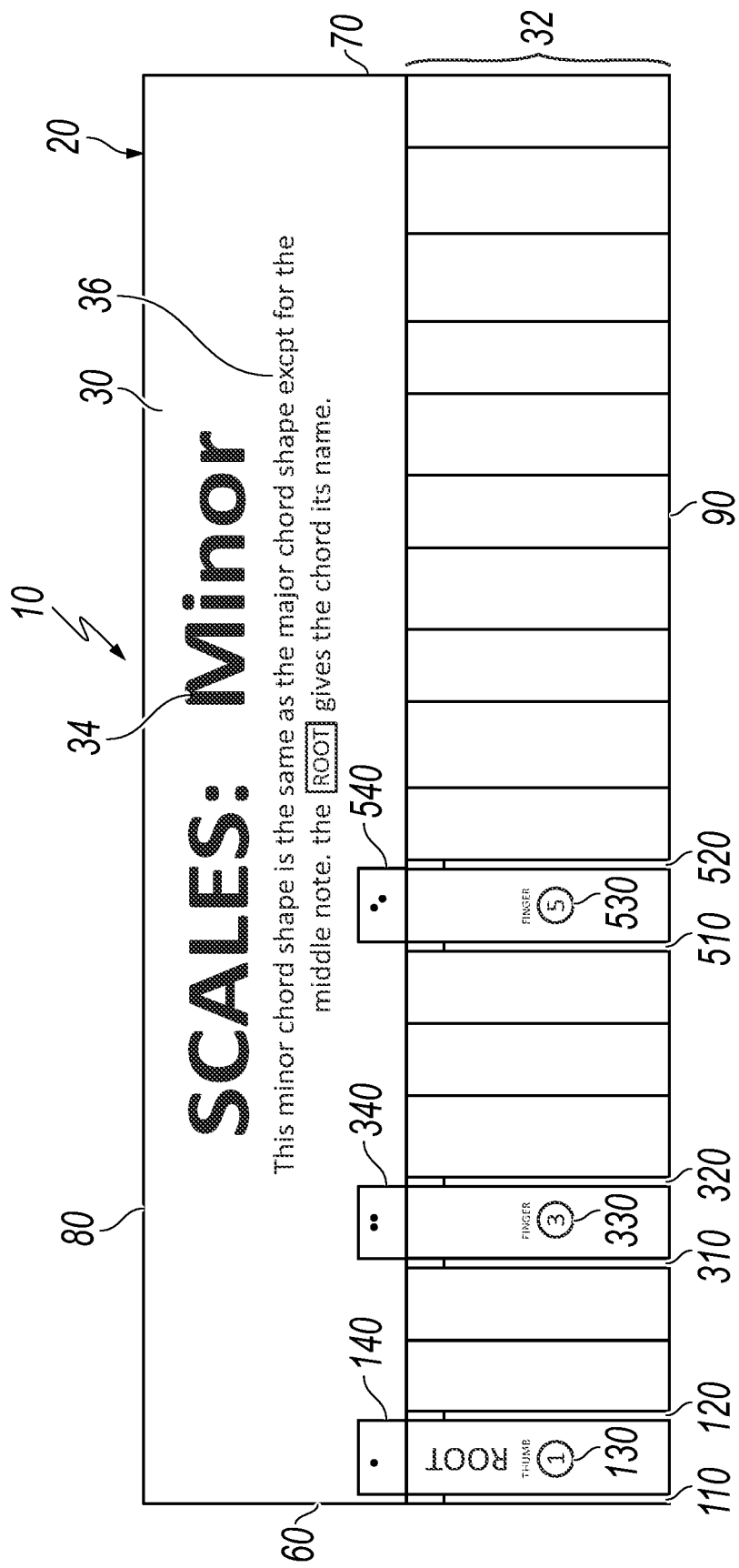
FIG. 3 illustrates a front view of the exemplary card of FIG. 1.
Figure 5:
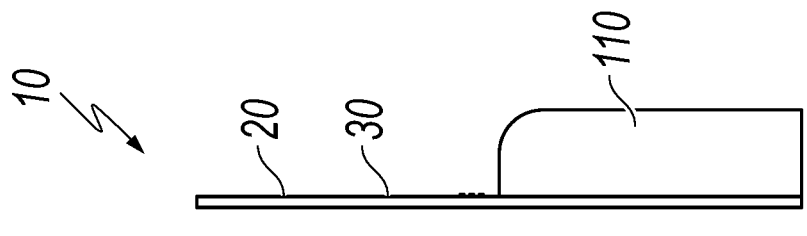
FIG. 5 illustrates a left side view of the exemplary card of FIG. 1.
Figure 4:
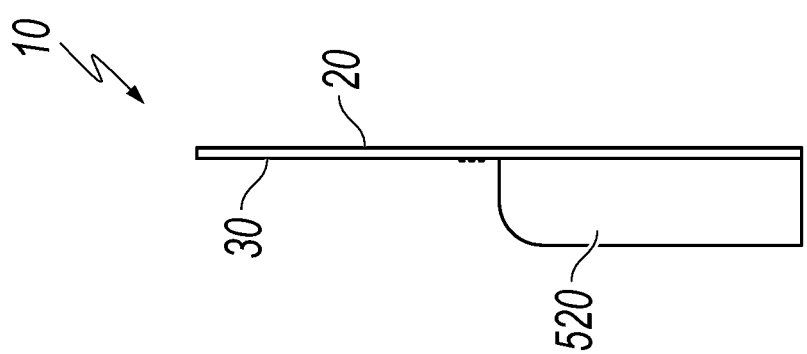
FIG. 4 illustrates a right side view of the exemplary card of FIG. 1.
Figure 6:
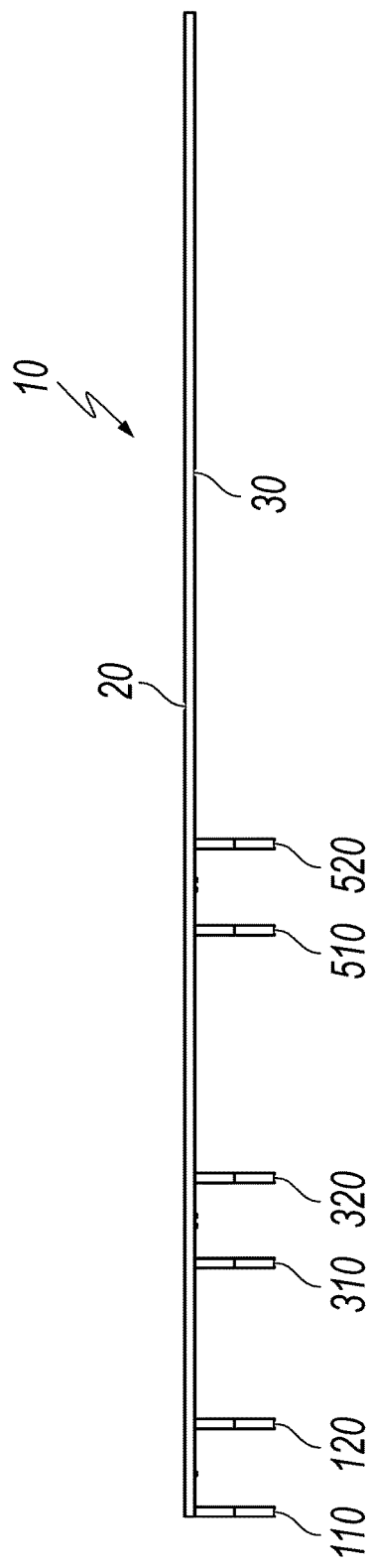
FIG. 6 illustrates a top view of the exemplary card of FIG. 1.
Figure 7:
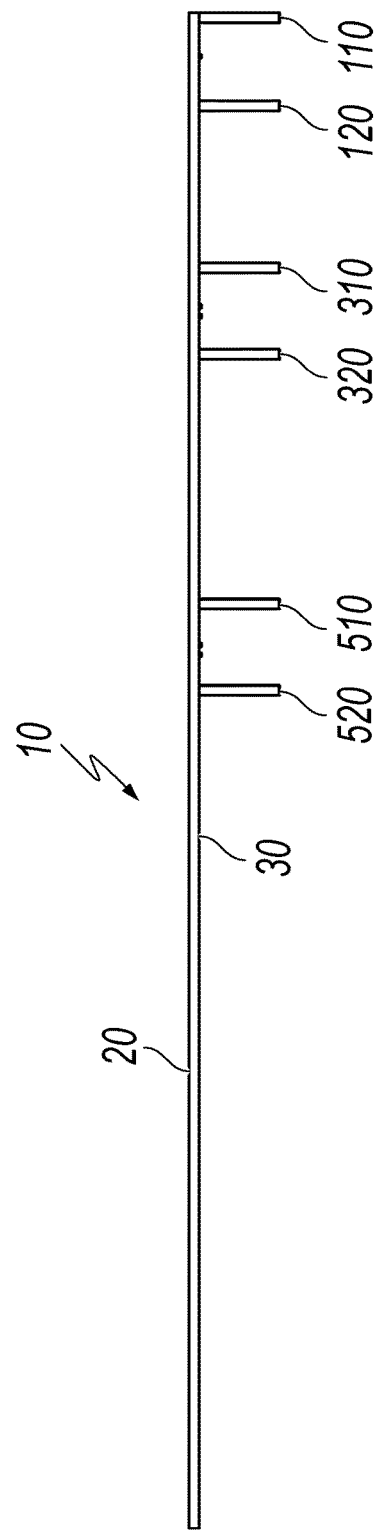
FIG. 7 illustrates a bottom view of the exemplary card of FIG. 1.

The figures illustrate exemplary embodiments of the present invention. The embodiments include apparatus, preferably sheets or cards, for playing chords, scales and/or intervals on piano and keyboards for visually-impaired people. Reference now will be made in detail to embodiments of the disclosure, one or more examples of which are illustrated in the figures. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIGS. 1-7 illustrate a variety of views of an exemplary minor chord card 10 according to the present disclosure. In particular embodiments, the minor chord card 10 includes generally a substantially rectangular sheet 20 of desired material. The card 10 may be defined by a substantially rectangular front side 30 and a substantially rectangular rear side 50 which is opposing to the front side 30. Between the front side 30 and the rear side 50, a body having a uniform thickness can be formed with a left side 60, a right side 70, a top side 80, and a bottom side 90 of the card 10. The card 10 can be made of any suitable material, including but not limited to paper, plastic, acrylic, wood, cardboard, fabric, etc., or any combination of the above.

A bar of parallel keys or notes 32 of around equal width can be printed or drawn on the lower portion of the card 10. Each piece of the notes 32 can have a width substantially the same as the width of the narrower back portion of a white key of a piano or the width of a black key of a piano that the total width of 12 consecutive notes 32 is around the same as the total width of one octave of a piano keyboard.

A card configuration can be associated with a specific chord or scale, such as a major chord, a minor chord, a major pentatonic scale, a minor pentatonic scale, etc. For example, on a minor chord configuration, the corresponding positions on the minor chord configuration related to the root note, the minor third note, and the perfect fifth note are stood out or highlighted by indicators or other means so that a visually-impaired person can recognize the relative positions of the three notes (i.e., the root note, the minor third note, and the perfect fifth note) in a minor chord without relying on the person's eye vision.

A root indicator can be attached to, included, or embedded with the card 10 on a position relatively close to the left side of a user when facing the card that when the root indicator is touched by a human finger or fingers, a difference between the root indicator and its surrounding area on the front side of the card can be recognized or sensed from the person who touched the root indicator without relying on any vision from that person.

In particular embodiments, the root indicator includes two protrusions or tabs 110, 120 arranged in parallel to each other and extending away from the front side 30 of the card 10. The left protrusion 110 is configured to be placed at a position corresponding to the left side of the root note of the notes 32. The right protrusion 120 is configured to be placed at a position corresponding to the right side of the root note of the notes 32. The distance between the left protrusion 110 and the right protrusion 120 is substantially the same as the width of the root note printed on the notes 32.

In particular embodiments, the protrusions 110, 120 are extended away from the front side 30 of the card 10 that when looking from the top side 80 or the bottom side 90 of the card 10, a portion of the card 10 looks like a Greek capital letter π (pi). In particular embodiments, when looking from the left side 60 of the card 10, the protrusion 110 has a shape of a rectangle with the top outer corner been cut or replaced with a circular segment. In other embodiments, the protrusions 110, 120 can have a shape of a segment, a semicircle, a parabolic segment, a half of an ellipse, a quarter of an ellipse, a L shape, a triangle, a parallelogram, a combination of the above shapes, or other shapes.

In particular embodiments, each of the protrusions 110, 120 has a front facing side 111, 121, a left facing side 113, 123, a right facing side, a top side 115, 125, and a bottom side 116, 126. The bottom side 116, 126 can be configured to be flashed with the bottom side 90 of the card 10. The top side 115, 125 can be aligned with the top edge of the bar of notes 32 that are printed on the card 10.

In some embodiments, the root indicator can include only one protrusion or tab. In particular embodiments, the root indicator includes only the left protrusion or tab 110. In particular embodiments, the root indicator includes only the right protrusion or tab 120.

A minor third indicator can be attached to, included, or embedded with the minor chord card on a position that is to the right side of the root indicator (when viewing from the user) that when the minor third indicator is touched by a human finger or fingers, a difference between the minor third indicator and its surrounding area can be recognized or sensed from the person who touched the minor third indicator without relying on any vision from that person.

In particular embodiments, the minor third indicator includes two protrusions or tabs 310, 320 arranged in parallel and extending away from the front side 30 (or rear side 50) of the card 10. The left protrusion 310 is configured to be placed at a position corresponding to the left side of a minor third note of the notes 32. The right protrusion 320 is configured to be placed at a position corresponding to the right side of the minor third note of the notes 32. The distance between the left protrusion 310 and the right protrusion 320 is substantially the same as the width of the root note printed on the notes 32.

In particular embodiments, each of the protrusions 310, 320 has a shape of a rectangle with the top outer corner been cut with a circular segment. In other embodiments, the protrusions 310, 320 can have a shape of a segment, a semicircle, a parabolic segment, a half of an ellipse, a quarter of an ellipse, a L shape, a triangle, a parallelogram, a combination of the above shapes, or other shapes. In particular embodiments, each of the protrusions 310, 320 has a front facing side, a left facing side, a right facing side, a top side, and a bottom side. The bottom side can be configured to be flashed with the bottom side 90 of the card 10. The top side can be aligned with the top edge of the bar of notes 32 printed on the card 10.

In particular embodiments, the minor third indicator includes only a left protrusion or tab 310. In particular embodiments, the minor third indicator includes only a right protrusion or tab 320.

A perfect fifth indicator can be attached to, included, or embedded with the minor chord card on a position that is to the right side of the minor third indicator (when viewing from the user) that when the perfect fifth indicator is touched by a human finger or fingers, a difference between the perfect fifth indicator and its surrounding area can be recognized or sensed from the person who touched the perfect fifth indicator without relying on any vision from that person.

In particular embodiments, the perfect fifth indicator includes two protrusions or tabs 510, 520 arranged in parallel and extending away from the front side 30 of the card 10. The left protrusion 510 is configured to be placed at a position corresponding to the left side of a perfect fifth note of the bar of notes 32. The right protrusion 520 is configured to be placed at a position corresponding to the right side of the perfect fifth note of the bar of notes 32. The distance between the left protrusion 510 and the right protrusion 520 is substantially the same as the width of the root note printed on the notes 32.

In particular embodiments, each of the protrusions 510, 520 has a shape of a rectangle with the top outer corner been cut with a circular segment. In other embodiments, the protrusions 510, 520 can have a shape of a segment, a semicircle, a parabolic segment, a half of an ellipse, a quarter of an ellipse, a L shape, a triangle, a parallelogram, a combination of the above shapes, or other shapes. In particular embodiments, each of the protrusions 510, 520 has a front facing side, a left facing side, a right facing side, a top side, and a bottom side. The bottom side can be configured to be flashed with the bottom side 90 of the card 10. The top side can be aligned with the top edge of notes 32 printed on the card 10.

In particular embodiments, the perfect fifth indicator includes only a left protrusion or tab 510. In particular embodiments, the perfect fifth indicator includes only a right protrusion or tab 520.

In particular embodiments, the distance between the left protrusions 110 of the root indicator and the left protrusion 310 of the minor third indicator on a minor chord configuration is 42 millimeters (mm) ±7%. In particular embodiments, the distance between the left protrusion 110 of the root indicator and the left protrusion 510 of the perfect fifth indicator on a minor chord configuration is 98 millimeters (mm) ±7%. In particular embodiments, the distance between the left protrusion 110 of the root indicator and the left protrusion 310 of the minor third indicator on a minor chord configuration is 42 millimeters (mm) ±3%. In particular embodiments, the distance between the left protrusion 110 of the root indicator and the left protrusion 510 of the perfect fifth indicator on a minor chord configuration is 98 millimeters (mm) ±3%.

In particular embodiments, each of the root indicator, the minor third indicator, and the perfect fifth indicator can include a braille character or characters 140, 340, 540 on the front side 30 of the card. For example, each of the braille characters 140, 340, 540 can be formed by a combination of six raised dots arranged in a 3×2 matrix. In particular embodiments, each of the braille characters 140, 340, 540 is located above its corresponding indicator or indicators 110, 120, 310, 320, 510, 520, respectively. In particular embodiments, each of the braille characters 140, 340, 540 is located above the bar of notes 32. In particular embodiments, note names 130, 330, 530 corresponding to each of the root note, minor third note, and perfect fifth note, respectively, can be printed or drawn on proper locations to identify these notes on the bar of notes 32. In particular embodiments, each of the braille characters 140, 340, 540 is located near its corresponding note names 130, 330, 530, respectively.

In particular embodiments, name 34 of the card 10 (for example, dedicated chord or scale name), descriptions 36 of the card 10, and/or other information, such as product number, logo, or other symbols, can be provided on the card in print, in braille characters, or both. In particular embodiments, braille characters or raised signs can be provided on the card 10 to show the orientation of the card 10.

Figure 8:
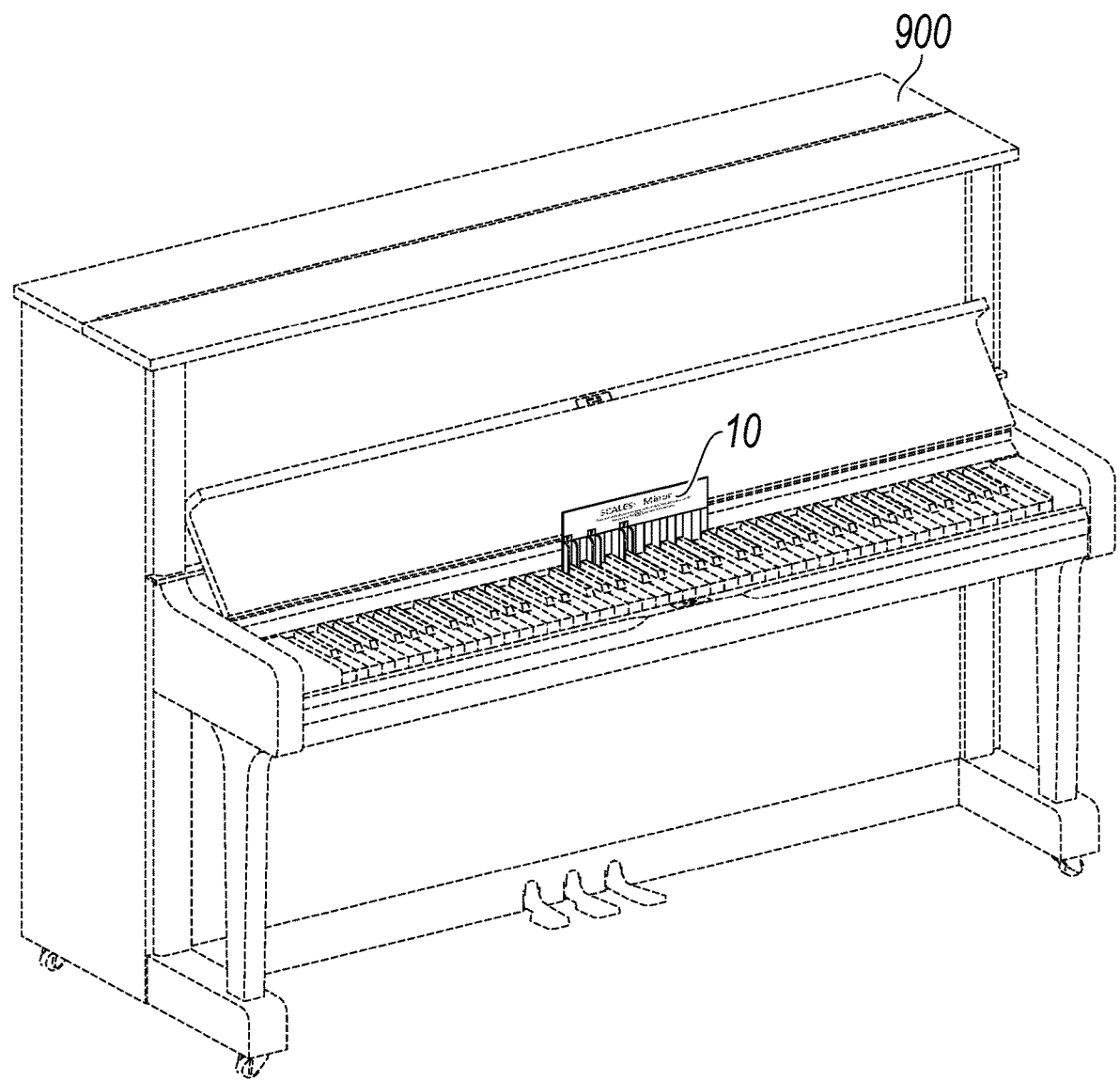
FIG. 8 illustrates a perspective view of the exemplary card of FIG. 1 with the card been placed behind the black keys of a piano keyboard.
Figure 9:
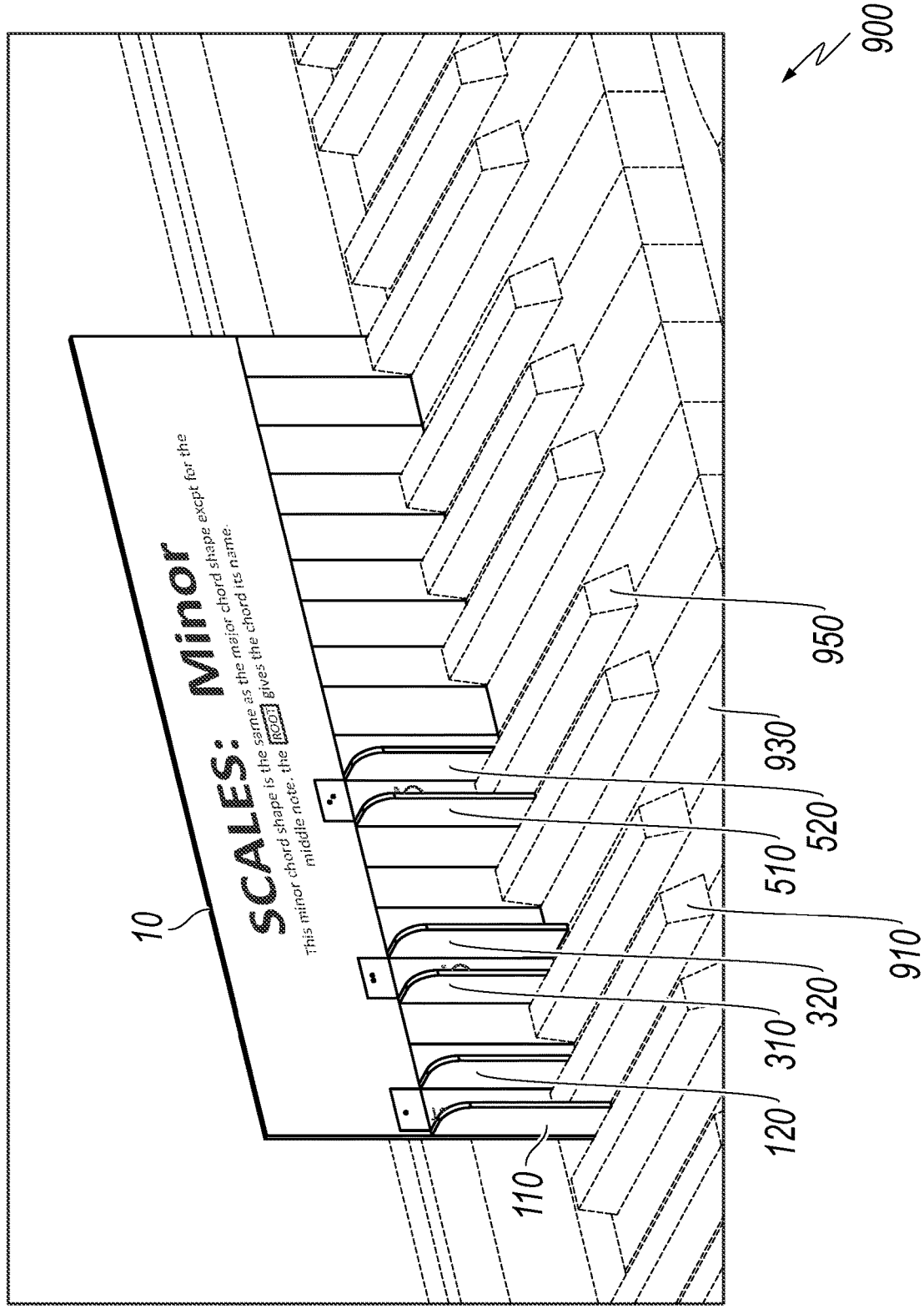
FIG. 9 illustrates an enlarged view of a portion of FIG. 8 to show the card been placed behind the black keys of a piano keyboard and with the root on the card lined up with the A♭ key of the piano keyboard.

Referring also to FIGS. 8-9, the minor chord card 10 can be placed behind the black keys of a piano or keyboard 900 with the rear side of the minor chord card 10 placed against the inner side of the piano fallboard. As shown in the figures, the bottom side of the minor chord card 10 can be inserted into the gap between the back end of the black keys and the inner side of the piano fallboard.

As shown in the particular example of FIG. 9, the root indicator of the minor chord card 10 is lined up with the A♭ key 910 of the piano 900 that the left protrusion 110 of the root indicator is placed between the G key and the A♭ key 910 of the piano 900 while the right protrusion 120 of the root indicator is placed between the A♭ key 910 and the A key of the piano. In addition, the minor third indicator is lined up with the B key 930 of the piano 900 that the left protrusion 310 of the minor third indicator is placed between the B♭ key and the B key 930 of the piano 900 while the right protrusion 320 of the minor third indicator is placed between the B key 930 and the C key of the piano. In addition, the perfect fifth indicator is lined up with the E♭ key 950 of the piano 900 that the left protrusion 510 of the perfect fifth indicator is placed between the D key and the E♭ key 950 of the piano 900 while the right protrusion 520 of the perfect fifth indicator is placed between the E♭ key 950 and the E key of the piano.

Thus, a visually-impaired piano learner can find the A♭ minor triad with the help of the minor chord card 10 when the root note of the card 10 is aligned with the root key (A♭ key 910 of the example shown in FIG. 9), that the minor third key (B key 930 of the example shown in FIG. 9) and the perfect fifth key (E♭ key 950 of the example shown in FIG. 9) on a piano or keyboard 900 can be identified by the minor third indicator 310, 320 and the perfect fifth indicator 510, 520, respectively.

Similarly, a visually-impaired piano learner can learn any minor triad chord with the minor chord card 10 by having the root note of the card 10 aligned with any desired key of the piano 900, a visually-impaired piano learner can find the other keys on a piano or keyboard that associated with the minor chord configuration are aligned with the minor third indicator and the perfect fifth indicator on the minor chord card 10. For example, if a C minor chord is desired to learn, a visually-impaired piano learner can learn the C minor chord by having the root note of the card 10 aligned with the C key of the piano 900 and then, he/she can find the E♭ key (which is aligned with the minor third indicator 310, 320) and the G key (which is aligned with the perfect fifth indicator 510, 520) on the piano.

In particular embodiments, the first note (which is associated with the root note) of the bar of notes 32 on the minor chord configuration can be printed or drawn in a first selected color (for example, red) while the 4$^{th}$ note (which is associated with the minor third) and the 8$^{th}$ note (which is associated with the perfect fifth) of the bar of notes can be printed or drawn in a second selected color (for example, blue) that is different from the first selected color. In particular embodiments, for a minor chord configuration, the root note, the minor third note, the perfect fifth note can be highlighted in color so that a person who recognizing the color can play with, work with, teach to or taught by a visually-impaired person.

In particular embodiments, each of the root indicator 110, 120, the minor third indicator 310, 320, and the perfect fifth indicator 510, 520 may be formed in a single, uniform piece with the front side (or rear side) of the card. In particular embodiments, each of the root indicator 110, 120, the minor third indicator 310, 320, and the perfect fifth indicator 510, 520 may be attached to the front side of the card 10 by any suitable attachment method, including but not limited to glue, taping, clamping, plugging, magnet, bolt and screw, and the like. The cards with protrusions can also be rendered out of a single piece of material such as plastic, metal, paper pulp and the like by means of injection molding, 3-D printing or any other means of creating a single, contiguous piece.

Accordingly, a visually-impaired person can play all minor triads on a piano with the card having the minor chord configuration 10 by aligning the root indicator to any piano key and finding the other two keys of the same chord on the piano by aligning the minor third indicator and the perfect fifth indicator to associated piano keys, respectively.

A card with a major chord configuration can be formed similarly as that of a minor chord configuration except that in a card with a major chord configuration, a major third note/indicator is used instead of a minor third note/indicator.

Figure 10:
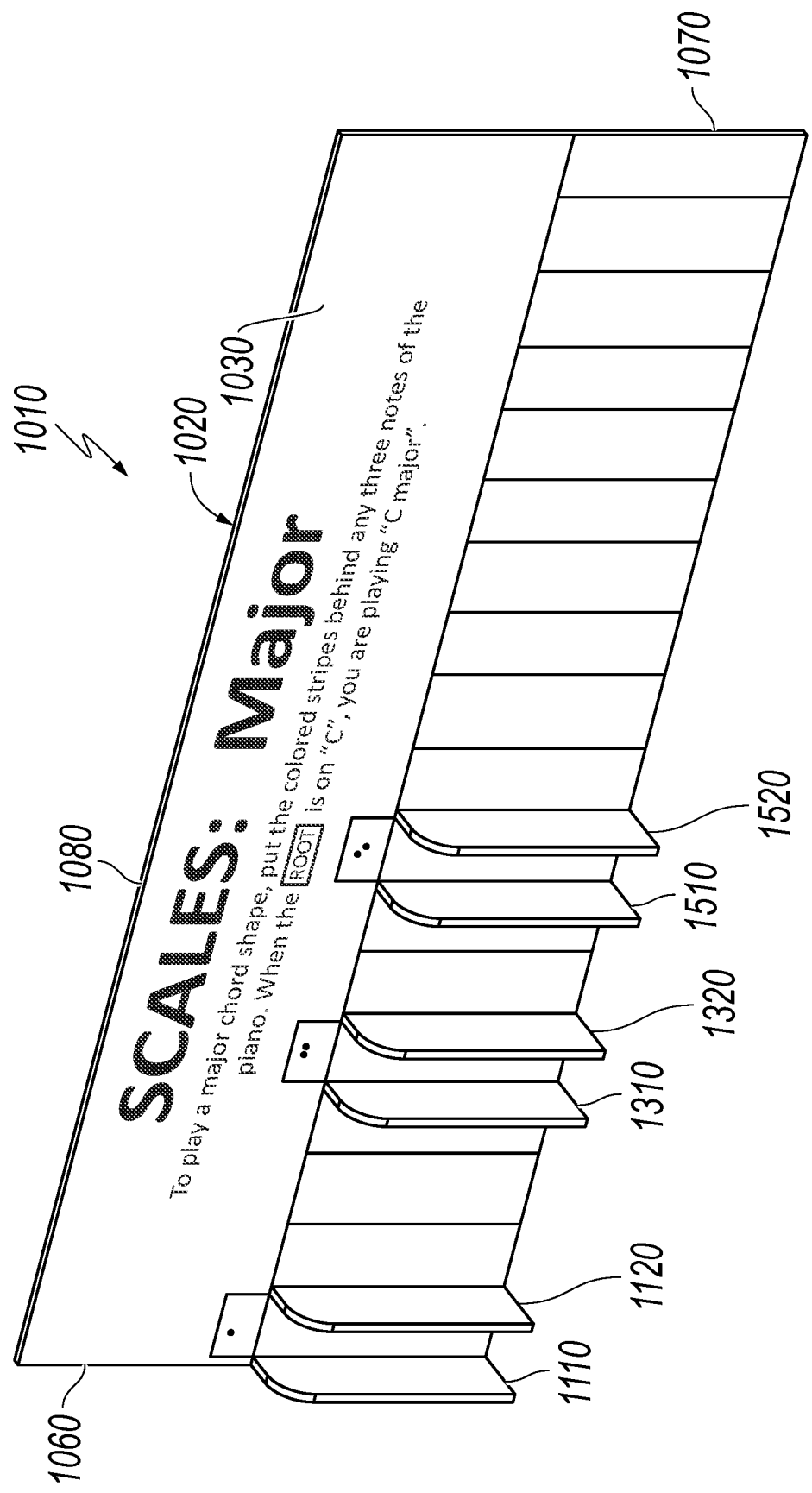
FIG. 10 illustrates a top-front-right perspective view of an exemplary major chord card.

Referring also to FIG. 10, a major chord card 1010 may be defined by a substantially rectangular front side 1030 and a substantially rectangular rear side opposing to the front side 1030. Between the front side 1030 and the rear side, a body having a uniform thickness can be formed with the left side 1060, right side 1070, top side 1080, and bottom side 1090 of the card 1010. The card 1010 can be made of any suitable material, including but not limited to paper, plastic, acrylic, wood, cardboard, fabric, etc., or any combination of the above. Notes of around equal width can be printed or drawn on the lower portion of the card 1010.

In particular embodiments, a root indicator includes two protrusions or tabs 1110, 1120 arranged in parallel and extending away from the front side 1030 of the card 1010. The left protrusion 1110 is configured to be placed at a position corresponding to the left side of a root note of the notes. The right protrusion 1120 is configured to be placed at a position corresponding to the right side of the root note of the notes. The distance between the left protrusion 1110 and the right protrusion 1120 is substantially the same as the width of the root note printed on the notes. In particular embodiments, each of the protrusions 1110, 1120 has a shape of a rectangle, a segment, a semicircle, a parabolic segment, a half of an ellipse, a quarter of an ellipse, a L shape, a triangle, a parallelogram, a combination of the above shapes, or other shapes.

In particular embodiments, a major third indicator includes two protrusions or tabs 1310, 1320 arranged in parallel and extending away from the front side 1030 of the card 1010. The left protrusion 1310 is configured to be placed at a position corresponding to the left side of a major third note of the notes. The right protrusion 1320 is configured to be placed at a position corresponding to the right side of the major third note of the notes. The distance between the left protrusion 1310 and the right protrusion 1320 is substantially the width of the root note printed on the notes. In particular embodiments, each of the protrusions 1310, 1320 has a shape of a rectangle, a segment, a semicircle, a parabolic segment, a half of an ellipse, a quarter of an ellipse, a L shape, a triangle, a parallelogram, a combination of the above shapes, or other shapes.

In particular embodiments, a perfect fifth indicator includes two protrusions or tabs 1510, 1520 arranged in parallel and extending away from the front side 1030 of the card 1010. The left protrusion 1510 is configured to be placed at a position corresponding to the left side of a minor third note of the notes. The right protrusion 1520 is configured to be placed at a position corresponding to the right side of the minor third note of the notes. The distance between the left protrusion 1510 and the right protrusion 1520 is substantially the width of the root note printed on the notes. In particular embodiments, each of the protrusions 1510, 1520 has a shape of a rectangle, a segment, a semicircle, a parabolic segment, a half of an ellipse, a quarter of an ellipse, a L shape, a triangle, a parallelogram, a combination of the above shapes, or other shapes.

In particular embodiments, the distance between the left protrusion 1110 of the root indicator and the left protrusion 1310 of the major third indicator on a major chord configuration is 56 millimeters (mm) ±7%. In particular embodiments, the distance between the left protrusion 1110 of the root indicator and the left protrusion 1510 of the perfect fifth indicator on a major chord configuration is 98 millimeters (mm) ±7%. In particular embodiments, the distance between the left protrusion 1110 of the root indicator and the left protrusion 1310 of the major third indicator on a major chord configuration is 56 millimeters (mm) ±3%. In particular embodiments, the distance between the left protrusion 1110 of the root indicator and the left protrusion 1510 of the perfect fifth indicator on a major chord configuration is 98 millimeters (mm) ±3%.

Accordingly, a visually-impaired person can play all major triads on a piano with a card having the major chord configuration 1010 by aligning the root indicator 1110, 1120 to any piano key and finding the other two keys of the same chord on the piano by aligning the major third indicator 1310, 1320 and the perfect fifth indicator 1510, 1520. For example, if the root indicator of a major chord configuration is aligned with the C note of a piano, the major third indicator would align with the E note and the perfect fifth indicator would align with the G note that the user would be able to find a C major triad on a piano keyboard.

In particular embodiments, each of the minor chord card 10 or major chord 1010 can optionally be extended to include a natural seventh indicator or a flat seventh indicator corresponding to the natural or major seventh note or a flat or minor seventh note on a piano, respectively. For example, the minor chord card 10 can additionally include a minor seventh indicator to form a minor seventh card. As another example, the major chord card 1010 can include a minor seventh indicator to form a dominant seventh card.

All major chords can have three patterns that each major chord can be played in three ways. For example, a C major triad contains the notes C, E, and G whereas the three patterns of a C major triad can be C1-E1-G1 or E1-G1-C2 or G1-C2-E2, where C2 is one higher octave than C1 and E2 is one higher octave than E1.

In particular embodiments, a card can have a second root indicator and a second major third indicator that the indicators are arranged, from left to right, in a row as the root indicator, the major third indicator, the perfect fifth indicator, the second root indicator, and the second major third indicator. In particular embodiments, the distance between the root indicator and the major third indicator on a three ways major chord configuration is 56 millimeters (mm) ±7%, the distance between the root indicator and the perfect fifth indicator on a three ways major chord configuration is 98 millimeters (mm) ±7%, the distance between the perfect fifth indicator and the second root indicator on a three ways major chord configuration is 70 millimeters (mm) ±7%, the distance between the second root indicator and the second major third indicator on a three ways major chord configuration is 56 millimeters (mm) ±7%. In particular embodiments, the distance between the root indicator and the major third indicator on a three ways major chord configuration is 56 millimeters (mm) ±3%, the distance between the root indicator and the perfect fifth indicator on a three ways major chord configuration is 98 millimeters (mm) ±3%, the distance between the perfect fifth indicator and the second root indicator on a three ways major chord configuration is 70 millimeters (mm) ±3%, the distance between the second root indicator and the second major third indicator on a three ways major chord configuration is 56 millimeters (mm) ±3%.

Similarly, all minor chords can have three patterns that each minor chord can be played in three ways. For example, a C minor triad contains the notes C, E♭, and G whereas the three patterns of a C minor triad can be C1-E♭1-G1 or E♭1-G1-C2 or G1-C2-E♭2, where C2 is one higher octave than C1 and E♭2 is one higher octave than E♭1.

In particular embodiments, a card can have a second root indicator and a second minor third indicator that the indicators are arranged, from left to right, in a row as the root indicator, the minor third indicator, the perfect fifth indicator, the second root indicator, and the second minor third indicator. In particular embodiments, the distance between the root indicator and the minor third indicator on a three ways minor chord configuration is 42 millimeters (mm) ±7%, the distance between the root indicator and the perfect fifth indicator on a three ways minor chord configuration is 98 millimeters (mm) ±7%, the distance between the perfect fifth indicator and the second root indicator on a three ways minor chord configuration is 70 millimeters (mm) ±7%, the distance between the second root indicator and the second minor third indicator on a three ways major chord configuration is 42 millimeters (mm) ±7%. In particular embodiments, the distance between the root indicator and the minor third indicator on a three ways minor chord configuration is 42 millimeters (mm) ±3%, the distance between the root indicator and the perfect fifth indicator on a three ways minor chord configuration is 98 millimeters (mm) ±3%, the distance between the perfect fifth indicator and the second root indicator on a three ways minor chord configuration is 70 millimeters (mm) ±3%, the distance between the second root indicator and the second minor third indicator on a three ways major chord configuration is 42 millimeters (mm) ±3%.

In addition to chords, a piano learner may learn scales, such as major scales, minor scales, major pentatonic scales, minor pentatonic scales, blues, etc. In particular embodiments, a card can have a corresponding indicator for each notes of a particular scale mentioned above that the indicators are attached to, included, or embedded with the particular card.

Figure 11:
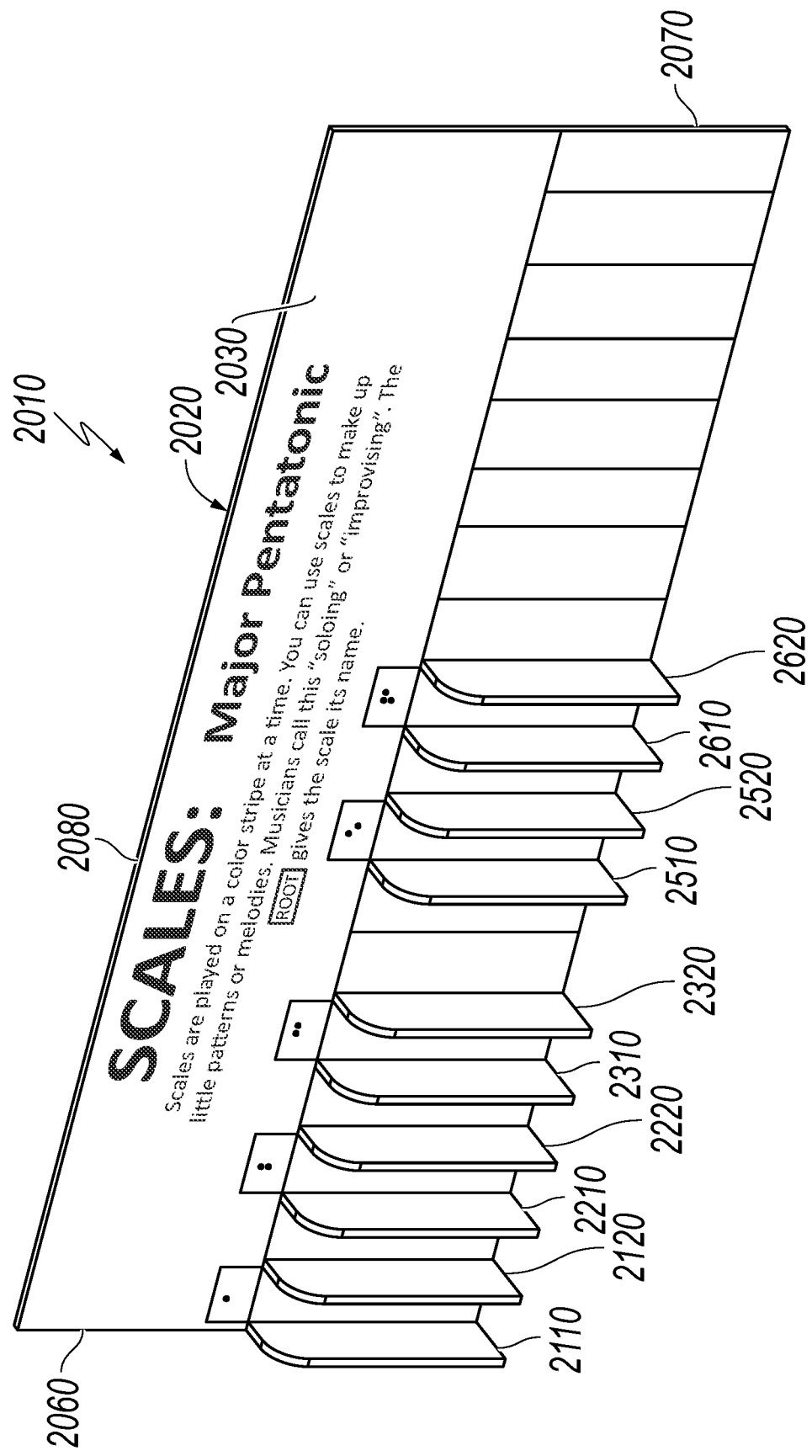
FIG. 11 illustrates a top-front-right perspective view of an exemplary major pentatonic card.

Referring to FIG. 11, a major pentatonic card 2010 can be arranged similar to that of the major chord card 1010 with the addition of a second indicator and a sixth indicator. The major pentatonic card 2010 may be defined by a substantially rectangular front side 2030 and a substantially rectangular rear side opposing to the front side 1030. Between the front side 2030 and the rear side, a body having a uniform thickness can be formed with the left side 2060, right side 2070, top side 2080, and bottom side 2090 of the card 2010. The card 2010 can be made of any suitable material, including but not limited to paper, plastic, acrylic, wood, cardboard, fabric, etc., or any combination of the above. Notes of around equal width can be printed or drawn on the lower portion of the card 2010.

The root indicator 2110, 2120, the major third indicator 2310, 2320, and the perfect fifth indicator 2510, 2520 can be arranged similar to that of the root indicator 1110, 1120, the major third indicator 1310, 1320, and the perfect fifth indicator 1510, 1520 of the major chord card 1010.

In particular embodiments, a second indicator includes two protrusions or tabs 2210, 2220 arranged in parallel and extending away from the front side 2030 of the card 2010. The left protrusion 2210 is configured to be placed at a position corresponding to the left side of a second note of the notes. The right protrusion 2220 is configured to be placed at a position corresponding to the right side of the second note of the notes. The distance between the left protrusion 2210 and the right protrusion 2220 is substantially the same as the width of the second note printed on the notes. In particular embodiments, each of the protrusions 2210, 2220 has a shape of a rectangle, a segment, a semicircle, a parabolic segment, a half of an ellipse, a quarter of an ellipse, a L shape, a triangle, a parallelogram, a combination of the above shapes, or other shapes.

In particular embodiments, a sixth indicator includes two protrusions or tabs 2610, 2620 arranged in parallel and extending away from the front side 2030 of the card 2010. The left protrusion 2610 is configured to be placed at a position corresponding to the left side of a sixth note of the notes. The right protrusion 2620 is configured to be placed at a position corresponding to the right side of the sixth note of the notes. The distance between the left protrusion 2610 and the right protrusion 2620 is substantially the width of the sixth note printed on the notes. In particular embodiments, each of the protrusions 2610, 2620 has a shape of a rectangle, a segment, a semicircle, a parabolic segment, a half of an ellipse, a quarter of an ellipse, a L shape, a triangle, a parallelogram, a combination of the above shapes, or other shapes.

Accordingly, a visually-impaired person can play all major pentatonic scales on a piano with a card having the major pentatonic configuration 2010 by aligning the root indicator 2110, 2120 to any piano key and finding the other four keys of the same scale on the piano by aligning the second indicator 2210, 2220, major third indicator 2310, 2320, the perfect fifth indicator 2510, 2520, and the sixth indicator 2610, 2620. For example, if the root indicator of a major chord configuration is aligned with the C note of a piano, the second indicator would align with the D note, the major third indicator would align with the E note, the perfect fifth indicator would align with the G note, and the sixth indicator would align with the A note that the user would be able to find a C major triad on a piano keyboard.

Figure 12:
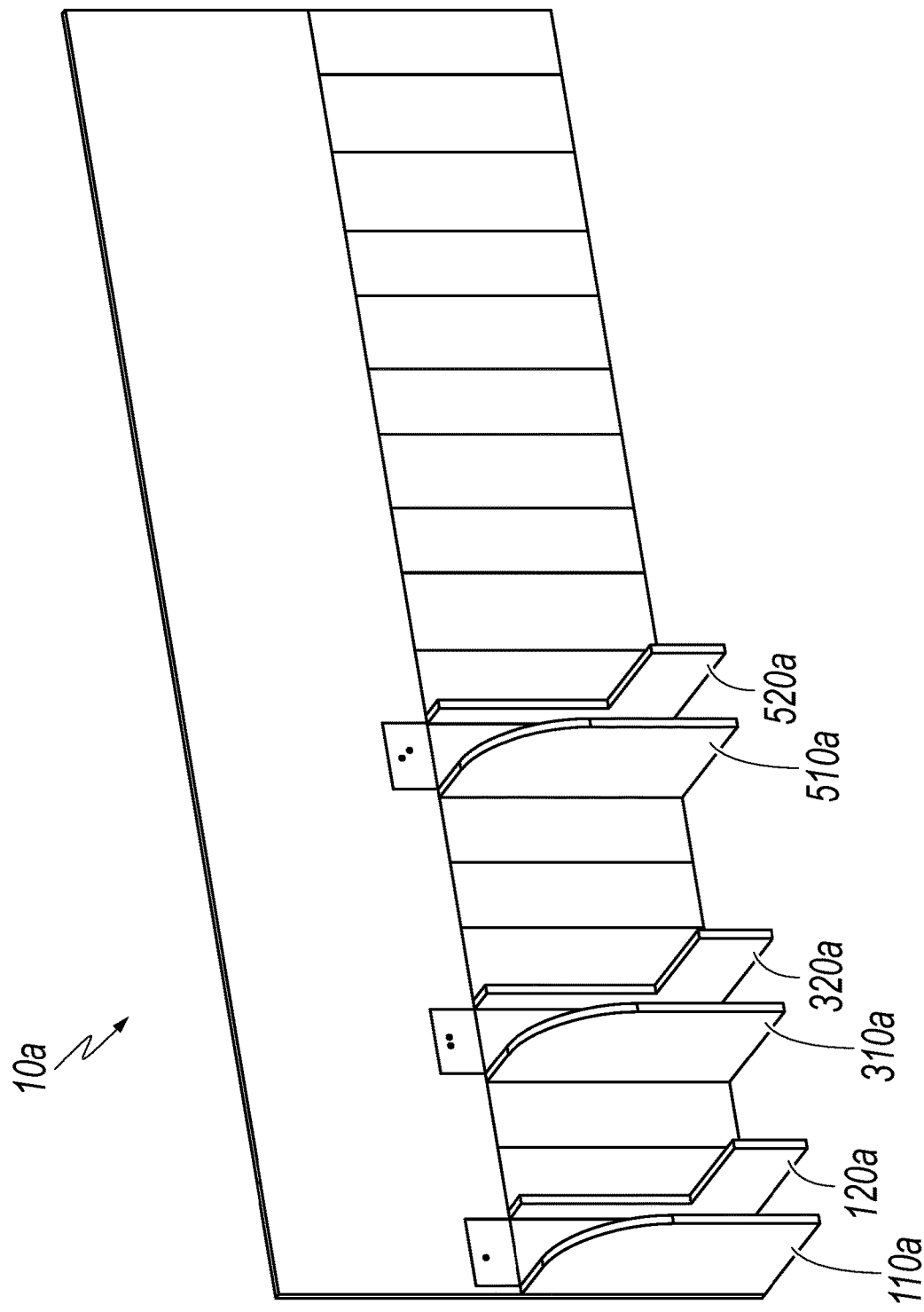
FIG. 12 illustrates a top-front-left perspective view of another embodiment of an exemplary minor chord card.

FIG. 12 illustrates a top-front-left perspective view of another embodiment of an exemplary minor chord card 10a. The exemplary minor chord card 10a of FIG. 12 can have similar arrangements as that of the minor chord card 10 in connection with FIGS. 1-7 with variations on the indicators. In particular embodiments, each of the left indicators or tabs 110a, 310a, 510a can have a different shapes as the right indicators or tabs 120a, 320a, 520a. As shown in the particular embodiment of FIG. 12, each of the left indicators 110a, 310a, 510a has a shape of a rectangle with a round top outer corner while each of the right indicators 120a, 320a, 520a has a shape of a rectangle with a cut out on the top outer corner, or a L shape.

Figure 13:
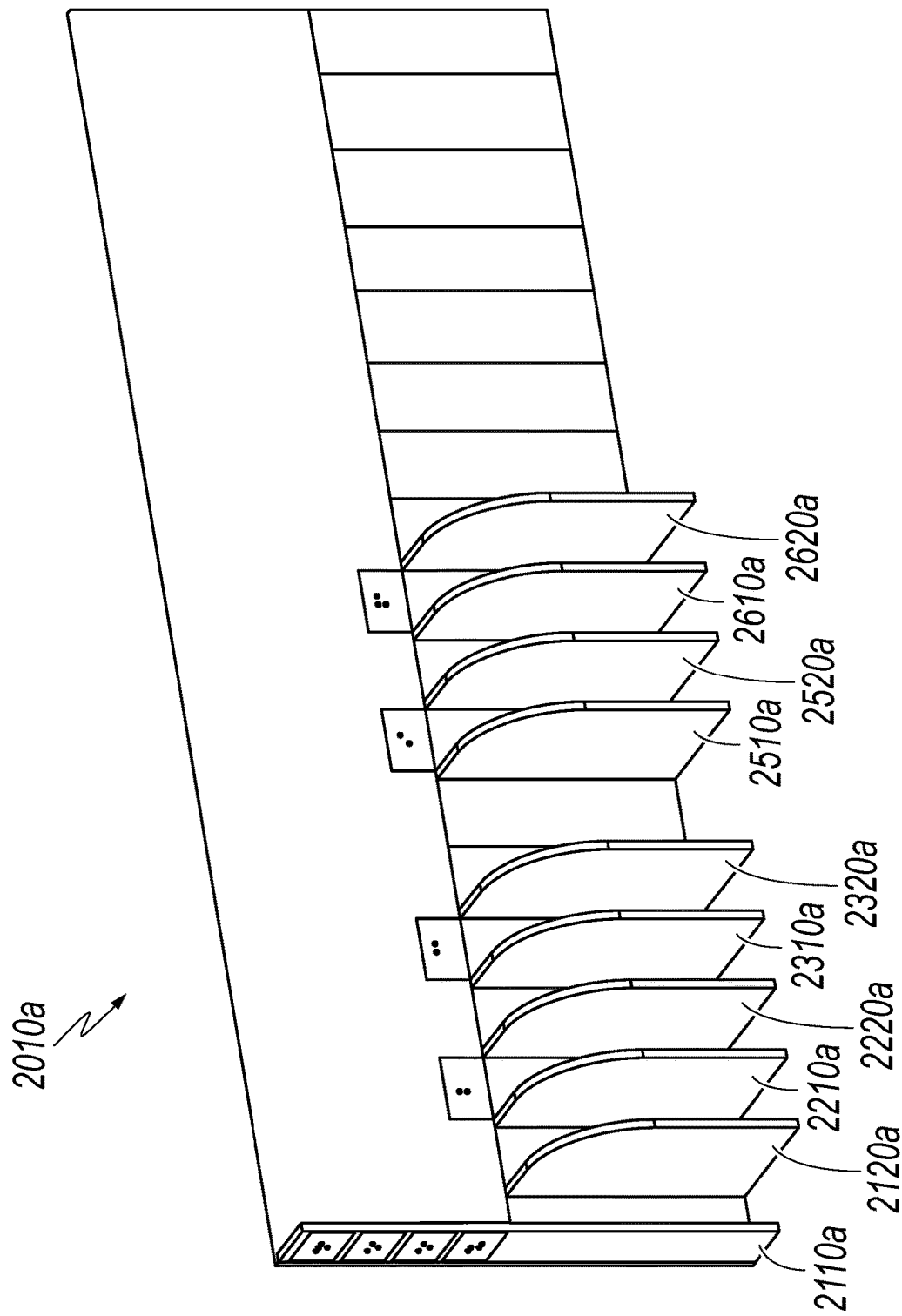
FIG. 13 illustrates a top-front-left perspective view of another embodiment of an exemplary major pentatonic card.

FIG. 13 illustrates a top-front-left perspective view of another embodiment of an exemplary major pentatonic card 2010a. The exemplary major pentatonic card 2010a of FIG. 13 can have similar arrangements as that of the major pentatonic card 2010 of FIG. 11 with variations on the indicators. In particular embodiments, the left root indicator 2110a has a shape that is different from the other indicators such as the right root indicator 2120a. As shown in the particular embodiment of FIG. 13, the left root indicator 2110a has a shape of a rectangle with a narrower width and higher height that the top side of the left root indicator 2110a extends above the printed notes. Thus, the distinct shape of the left root indicator 2110a comparing with the rest indicators can facilitate identifying the location of the root indicator by a visually-impaired person. In addition, the left root indicator 2110a can include braille character or characters to help identifying the position of the root indicator.

Figure 14:
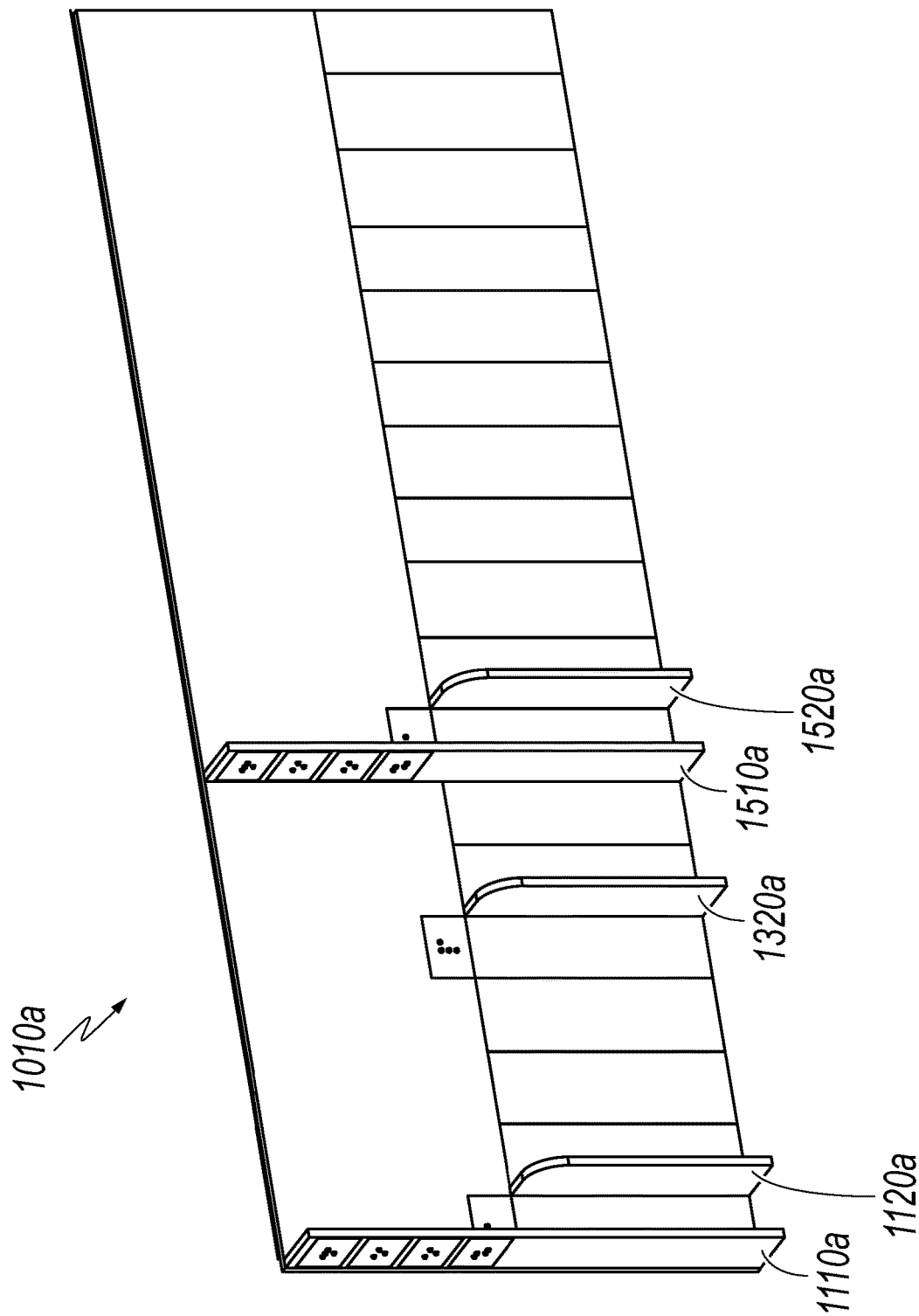
FIG. 14 illustrates a top-front-left perspective view of another embodiment of an exemplary major chord card.

FIG. 14 illustrates a top-front-left perspective view of another embodiment of an exemplary major chord card 1010a. The exemplary major pentatonic card 1010a of FIG. 14 can have similar arrangements as that of the major pentatonic card 1010 of FIG. 10 with variations on the indicators. In particular embodiments, the left root indicator 1110a has a shape that is different from the other indicators such as the right root indicator 1120a. As shown in the particular embodiment of FIG. 14, the left root indicator 1110a has a shape of a rectangle with a narrower width and higher height that the top side of the left root indicator 1110a extends above the printed notes. Thus, the distinct shape of the left root indicator 1110a comparing with the rest indicators can facilitate identifying the location of the root indicator by a visually-impaired person. In addition, the left root indicator 1110a can include braille character or characters to help identifying the position of the root indicator. In particular embodiments, the left perfect fifth indicator 1510a has a shape of a rectangle with a narrower width and higher height that the top side of the left perfect fifth indicator 1510a extends above the printed notes. Thus, the distinct shape of the left perfect fifth indicator 1510a can facilitate identifying the location of the last indicator by a visually-impaired person. In addition, the left perfect fifth indicator 1510a can include braille character or characters to help identifying the position of the last indicator.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. An apparatus for playing chords, scales and/or intervals on a keyboard of a musical instrument for visually-impaired people, the apparatus comprising:
   a substantially rectangular card defined by a substantially rectangular front side, a rear side opposing to the front side, a left side, a right side, a top side and a bottom side;
   a first indicator attached to the card on a position relatively close to the left side of the card;
   a second indicator attached to the card on a position that is on the right side to the root indicator; and
   a third indicator attached to the card on a position that is on the right side to the second indicator, wherein each of the first, second and third indicators includes a protrusion extending away from the front side of the card.

2. The apparatus of claim 1, wherein the first indicator is associated with a root note on a piano keyboard, the second indicator is associated with a major third note on the piano keyboard, and wherein the third indicator is associated with a perfect fifth note on the piano keyboard.

3. The apparatus of claim 1, wherein the first indicator is associated with a root note on a piano keyboard, the second indicator is associated with a minor third note on the piano keyboard, and wherein the third indicator is associated with a perfect fifth note on the piano keyboard.

4. The apparatus of claim 1, wherein a distance between first indicator and the second indicator is larger than a distance between second indicator and the third indicator.

5. The apparatus of claim 1, wherein a distance between first indicator and the second indicator is smaller than a distance between second indicator and the third indicator.

6. The apparatus of claim 1, wherein the protrusion has a shape of one of a rectangle, a segment, a semicircle, a parabolic segment, or a half of an ellipse.

7. The apparatus of claim 1, wherein each of the first, second and third indicators includes a braille character.

8. The apparatus of claim 7, wherein each of the braille character is located above its corresponding indicator.

9. The apparatus of claim 1, wherein music notes are printed on the front side along the bottom side of the card to show the place of the first, second and third indicators.

10. The apparatus of claim 1, wherein the card is made of paper.

11. The apparatus of claim 2 further comprising a fourth indicator associated with a second root note on a piano keyboard and a fifth indicator associated with a second major third note on the piano keyboard.

12. The apparatus of claim 3 further comprising a fourth indicator associated with a second root note on a piano keyboard and a fifth indicator associated with a second minor third note on the piano keyboard.

13. The apparatus of claim 2 further comprising a fourth indicator, wherein the fourth indicator is associated with a minor seventh note on the piano keyboard.

14. The apparatus of claim 3 further comprising a fourth indicator, wherein the fourth indicator is associated with a minor seventh note on the piano keyboard.

15. An apparatus for playing chords, scales and/or intervals on a keyboard of a musical instrument for visually-impaired people, the apparatus comprising:
a substantially rectangular card defined by a substantially rectangular front side, a rear side opposing to the front side, a left side, a right side, a top side and a bottom side;
a first indicator attached to the card on a position relatively close to the left side of the card:
a second indicator attached to the card on a position that is on the right side to the root indicator; and
a third indicator attached to the card on a position that is on the right side to the second indicator, wherein each of the first, second and third indicators includes two protrusions extending away from the front side of the card.

16. The apparatus of claim 15, wherein each of the protrusions has a shape of one of a rectangle, a segment, a semicircle, a parabolic segment, or a half of an ellipse.

17. The apparatus of claim 15, wherein the two protrusions of each of the first, second and third indicators have different shapes.

18. An apparatus for playing chords, scales and/or intervals on a keyboard of a musical instrument for visually-impaired people, the apparatus comprising:
a substantially rectangular card defined by a substantially rectangular front side, a rear side opposing to the front side, a left side, a right side, a top side and a bottom side;
a first indicator attached to the card on a position relatively close to the left side of the card:
a second indicator attached to the card on a position that is on the right side to the root indicator; and
a third indicator attached to the card on a position that is on the right side to the second indicator, wherein the first indicator includes a left protrusion and a right protrusion extending away from the front side of the card, and wherein the left protrusion is higher than the right protrusion.

19. The apparatus of claim 18, wherein the left protrusion includes a braille character.

20. An apparatus for playing chords, scales and/or intervals on a keyboard of a musical instrument for visually-impaired people, the apparatus comprising:
a substantially rectangular card defined by a substantially rectangular front side, a rear side opposing to the front side, a left side, a right side, a top side and a bottom side;
a first indicator attached to the card on a position relatively close to the left side of the card:
a second indicator attached to the card on a position that is on the right side to the root indicator; and
a third indicator attached to the card on a position that is on the right side to the second indicator, wherein the third indicator includes a left protrusion and a right protrusion extending away from the front side of the card, and wherein the left protrusion is higher than the right protrusion.

21. The apparatus of claim 20, wherein the left protrusion includes a braille character.

* * * * *